July 11, 1967     K. P. BELLINGER     3,330,864
METHOD FOR MAKING UREA NITRATE
Filed April 29, 1965
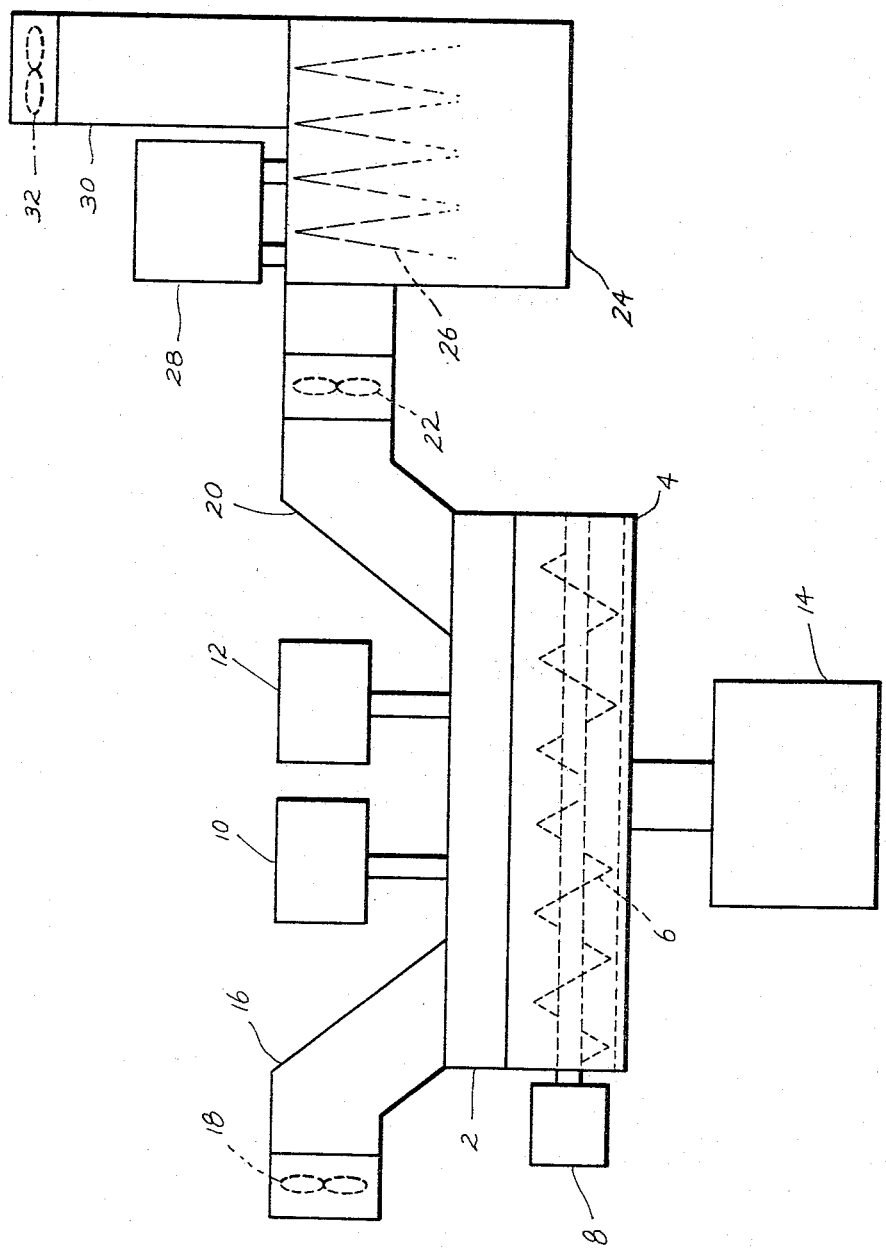
INVENTOR.
KENNETH P. BELLINGER
BY *Peter L. Costas*
ATTORNEY

3,330,864
METHOD FOR MAKING UREA NITRATE
Kenneth P. Bellinger, Ellington, Conn., assignor to Conversion Chemical Corporation, Rockville, Conn., a corporation of Connecticut
Filed Apr. 29, 1965, Ser. No. 451,815
9 Claims. (Cl. 260—555)

The present invention relates to a method for the manufacture of urea nitrate.

Heretofore, it has been recognized that urea and nitric acid may be reacted in molar equivalents to produce urea nitrate. One of the major difficulties in the manufacture of urea nitrate has been the problem of economical and efficient manufacture of a relatively dry product which could be readily shipped and the avoidance of decomposition of the urea nitrate. Heretofore, it has been proposed to commercially manufacture urea nitrate by admixing an aqueous solution of urea and concentrated nitric acid in moderate excess while the mixture was stirred and kept cool. The reaction was allowed to proceed and crystals of urea nitrate precipitated out from the solution. Thereafter, these crystals were dried, generally under vacuum.

It is the aim of the present invention to provide an improved method for the manufacture of relatively dry urea nitrate within a relatively short period of time and at relatively low cost.

A related aim is to provide such a method wherein in the heat of reaction is utilized in a controlled manner so as to accomplish a substantial measure of the drying of the urea nitrate product.

Other aims and advantages will be readily apparent from the following detailed description and claims and the attached drawing wherein the figure is a diagrammatic illustration of apparatus which may be employed in accordance with one embodiment of the present invention.

It has now been found that the foregoing and related aims and advantages may be readily attained in the manufacture of urea nitrate by a method wherein urea and an aqueous solution of about 63.0 to 85.0 percent by weight nitric acid are admixed within a reaction vessel and the heat of reaction within the admixture is controlled during the period immediately following the reaction therein to obtain a temperature of about 105°–135° centigrade within the reaction product. The reaction product is agitated so as to produce substantially homogeneity therein and to expose substantially the entire mass of the reaction product to the atmosphere within the reaction vessel for evolution of moisture vapor therefrom. Thereafter the reaction product is cooled so as to obtain urea nitrate as a relatively dry powder containing 10 percent or less by weight water.

Although the heat of reaction alone may provide adequate drying of the reaction product where the reaction vessel permits close control of the temperature within the admixture as by use of a heating or cooling jacket when required, a supplementary drying process has proven beneficial in some circumstances wherein a heated gas which is substantially inert to the reaction product is passed over and through the reaction product as it is being agitated. In order to have the desired effect of stripping additional moisture from the reaction product, the heated gas should be of relatively low humidity. In practice, air heated to a temperature of 49°–100° centigrade and having a humidity of less than 60 percent has proven satisfactory. The velocity of the air through the reaction vessel should be controlled so as to minimize entrainment of the reaction product.

The temperature attained within the reaction product as a result of the reaction is extremely critical. Below 105° centigrade, the reaction does not appear to proceed rapidly to completion and the amount of water evolved from the admixture is too low for efficient operation for the purposes of the present invention even with supplementary drying through the use of heated inert gas. Above 135° centigrade, some form of secondary reaction appears to take place which results in a reduction in the total amount of free acid released by the reaction product upon solution in water. This temperature limit of 135° centigrade to avoid this reaction is distinct from that of the melting and decomposition point of urea nitrate which is 152° centigrade. The nature of this secondary reaction is not understood but once the secondary reaction begins to take place, there has been observed to be a continuing degradation of the product even after the temperature has been reduced substantially.

With the more dilute solutions of nitric acid, it is generally necessary to preheat the solution so as to ensure a temperature in the reaction product within the desired range. For example, when employing a solution contining 68 percent by weight nitric acid, it is desirable to preheat the solution to a temperature of approximately 77° to 95° centigrade. When employing an acid solution containing 75 to 85 percent by weight nitric acid, preheating may be disposed with and, in fact, cooling may be desirable when employing solutions containing 80 to 85 percent by weight nitric acid. The actual conditions of preheating or cooling will be dependent upon the masses employed and the nature of the reaction vessel as well as the procedure for admixing the urea and nitric acid solution. The conditions for any given unit may be readily determined by preliminary tests, as will be readily apparent to those having ordinary skill in the art.

Indicative of the effect of the variables of acid concentration and initial temperature of the acid solution are the tests reported in Table 1 wherein molar equivalents of urea and nitric acid solution were admixed in the reaction vessel and agitated during and subsequent to reaction. No heated inert gas was employed.

TABLE 1

| Test No. | 1 | 2 | 3 | 4 | 5 | 6 | 7 | 8 | 9 | 10 | 11 | 12 | 13 |
|---|---|---|---|---|---|---|---|---|---|---|---|---|---|
| Acid, Percent by Wt., $H_2O$ | 45 | 40 | 32 | 28 | 28 | 28 | 25 | 25 | 25 | 25 | 20 | 15 | 10 |
| Acid Temp., °C | 77 | 77 | 93.5 | 29.5 | 54.5 | 82 | 65.5 | 77 | 82 | 93.5 | 29.5 | 29.5 | 29.5 |
| Max. Reaction Temp., °C | 91 | 98 | 117 | 111 | 110 | 127 | 126 | 132 | 127 | 138+ | 119 | 138+ | 138+ |
| $H_2O$, Product Percent by Wt. | 30.0 | 26.0 | 9.0 | 10.0 | 10.3 | 5.0 | 7.0 | 3.0 | 2.5 | (¹) | 2.0 | (¹) | (¹) |
| Urea added to Acid | x | x | x | x |  | x | x | x | x | x | x | x | x |
| Acid added to Urea |  |  |  |  |  |  |  |  |  |  |  |  |  |

¹ The temperature rose rapidly to a peak somewhat above the indicated temperature and a secondary reaction took place.

The temperature of the reaction product is desirably maintained within the range of 105°–135° centigrade for at least several minutes following the time of reaction so as to accomplish maximum evolution of moisture therefrom and to achieve substantially complete reaction where desirably the temperature of the reaction product is controlled by use of a jacketed reaction vessel which may be heated by steam under pressure or chilled as the occasion requires. Continued heating of the reaction product is particularly significant when stripping by use of a heated inert gas is employed to dry the reaction product still further. Although the inert gas may be used to supply some heat to the reaction product so as to maintain an elevated temperature, far greater efficiency in maintaining the elevated temperature within the product is provided by use of the heated jacket for the reaction vessel.

As will be readily apparent to those skilled in the art, the urea and nitric acid solution may be added continuously to a so-called continuous reactor wherein they are agitated and allowed to react during their path from the feed end to the exit end. This type of reactor affords significant advantages in enabling closer temperature control of the reaction product and minimization of hot spots and excessively violent reaction. Its principal disadvantage is the cost and need for relatively continuous operation. In using a batch type operation, both the urea and the nitric acid solution may be metered in simultaneously as they are continually admixed by a screw or other device. Alternatively, when one of the components is to be inserted into the reaction vessel prior to feeding in the other component, the nitric acid solution is desirably added to the urea while the admixture is being agitated. In this manner a greater degree of control over the reaction can be attained to avoid excessive hot spots or an excessively violent reaction which would result in loss of nitric acid vapor or reaction product to the fume.

Because of the exothermic reaction and the corrosive nature of the nitric acid and of urea nitrate, the reaction vessel and auxiliary equipment should be fabricated from temperature and corrosion-resistant materials such as stainless steel alloys. Since the reaction itself may generate considerable volumes of fume and entrained reaction product, it is desirable to employ means for cleaning the fume such as a scrubbing chamber utilizing an alkaline spray.

As will be readily apparent, the nitric acid solution and urea are most desirably employed in equal molar quantities since an excess of nitric acid in the reaction product would generally be undesirable although some excess may be desirable to compensate for loss of nitric acid in the fume in more violent reactions. However, for some applications, an excess of urea may prove advantageous in that the urea will tend to absorb moisture and maintain the composition in a desirable powdery form by reducing the tendency to cake.

Referring now to the attached drawing, therein is diagrammatically illustrated apparatus which may be employed in carrying out the present invention. A reaction vessel 2, desirably fabricated of stainless steel, has an arcuate lower portion in which freely but closely rotates the agitating shaft 6 which has helical blades extending toward the center from either end and is driven by the motor 8. The lower portion of the reaction vessel is provided with a jacket 4 into which steam or coolant may be introduced as required and the top of the reaction vessel has a removable cover permitting entry into the interior but closing the vessel to the atmosphere during operation.

Urea and nitric acid solution are introduced into the reaction vessel 2 from the supply sources designated by the numerals 10, 12 and the reaction is allowed to proceed with the spiral shaft 6 agitating the admixture and the reaction product so as to ensure homogeneity therein and to expose substantially the entire mass of the reaction product to the atmosphere within the reaction vessel for evolution of moisture vapor therefrom. If the nitric acid solution and temperature have been selected to yield the reaction product of the desired moisture content without the necessity for further treatment, the resultant product is allowed to cool within the reaction vessel and is then discharged through the discharge port 14.

When additional drying is desired beyond that provided by utilization of the heat of reaction and such additional heat as may be introduced through the jacket 4, a heated inert gas may be blown into the reaction vessel 2 through the duct 16 by the fan 18. As the heated gas passes through the reaction product which is being agitated by the spiral shaft 6, it tends to remove additional moisture from the reaction product. The gas is drawn outwardly from the reaction vessel 2 into the exhaust duct 20 by the fan 22 and it then passes through a scrubber 24 wherein it is washed by a neutralizing solution issuing from the spray heads 26 which are fed by the tank 28. The scrubbed gas is then exhausted to the atmosphere through the duct 30 by the action of the fan 32.

Illustrative of the specific embodiments of the present invention are the following specific examples:

*Example 1*

To a stainless steel reaction vessel installation of the type diagrammatically illustrated in FIGURE 1 of the attached drawing was added an aqueous solution containing 68 percent nitric acid. Steam at approximately 5 p.s.i.g. was introduced to the jacket and utilized to preheat the aqueous solution to a temperature of 77° centigrade. An equivalent molar quantity of urea was added to the heated nitric acid solution and the components were admixed by the spiral blending shaft. Upon additon of the urea to the nitric acid, the reaction took place rapidly and after approximately one minute the temperature in the admixture was observed to be 110° centigrade.

The reaction vessel was heated during the ensuing period by the steam jacket and air of 43 percent humidity was introduced into the reaction vessel at a temperature of approximately 52° centigrade at relatively low velocity. After five minutes the temperature in the reaction product had dropped to 85° centigrade and at the end of ten minutes the temperature had dropped to 55° centigrade. The drying of the reaction product by the heated air was continued until one hour from the time of the initial reaction.

Upon removal from the reaction vessel, the product was found to be a very dry powder having a highly desirable flaky quality. Upon solution of the dried reaction product in water in the amount of 100 grams per liter, the pH was found to be 0.53. Upon titration of a 5 cc. sample of a solution obtained by dissolving 10 grams of reaction product in 100 cc. of water, it was found that 3.9 cc. of 1 N sodium hydroxide solution was required to neutralize the free acid.

*Example 2*

To the same reaction vessel installation which did not have the heating jacket in operation, was added 84.8 liters of an aqueous solution containing 78.3 percent nitric acid and 90.72 kilograms urea. The temperature of the acid solution was 14.5° centigrade. The reaction commenced immediately and the temperature rapidly rose to approximately 118° centigrade. After approximately two minutes, the temperature of the reaction product had dropped to 105° centigrade and after fifteen minutes the temperature had dropped to 32° centigrade. During the entire time, the reaction product was being agitated by the spiral screw shaft.

The reaction product was then removed from the reaction vessel and was found to weigh 189.2 kilograms and to be a substantially dry powder containing less than about 2 percent moisture.

Upon testing a solution containing 10 grams of the reaction product in 100 cc. water, the pH was found to be 0.42. In the test to determine free acid described in Example 1 above, it was found that 4.15 cc. of 1 N sodium hydroxide were utilized.

Example 3

To illustrate the effect of temperature, a first test was conducted wherein a nitric acid solution containing 25 percent water was preheated to a temperature of 77° centigrade and urea was then added thereto. The temperature of the reaction product rapidly rose to 132.2° centigrade. Upon cooling, the product was found to contain about 3.0 percent by weight water. The pH of a 10 percent by weight solution was determined at 0.46 and it was found that 4.0 cc. of 1 N sodium hydroxide were required to neutralize the available acid in a 5 cc. sample of the 10 percent solution.

A second test was conducted wherein the acid solution was preheated to a temperature of 93.4° centigrade and the urea was then added thereto. The temperature of the reaction product rose rapidly to approximately 138° centigrade. The product in the reaction vessel started to bubble and turned fluid and then appeared to undergo some form of a secondary reaction. The temperature then rose rapidly to approximately 157° centigrade and thereafter began to drop down with evidence of reaction continuing to take place within the product during cooling.

After the mixture had cooled, it was found that the resultant product equalled only 91.5 percent of the weight that would have been theoretically obtained from the admixture. Upon dissolving 10 grams of the product in 100 cc. water, the pH was found to be 0.5. In the test to determine available acid, only 3.4 cc. of 1 N sodium hydroxide were required to neutralize a 5 cc. sample of the solution.

Thus it can be seen that the secondary reaction produced a variation in the product as evidenced by the difference in the amount of available acid provided by a solution thereof.

Thus it can be seen from the foregoing specific examples that the present invention provides a rapid and a relatively economical method for obtaining a relatively dry urea nitrate product under conditions which may be easily controlled, particularly in apparatus of the type described. The use of heated inert gas may prove particularly valuable in effecting drying to a very low moisture content and is especially advantageous in using acid solutions of lower concentrations. However, the product readily expels water upon exposure to atmosphere and may be dried after removal from the reaction vessel by merely storing it in and exposing it to relatively dry atmosphere.

Although products of less than 10 percent water have proven generally satisfactory for most metal treating formulations, a moisture content of less than about 5 percent by weight and preferably 0 to 5.0 percent by weight is most desirably employed to minimize the variable of moisture in the ultimate formulations. By use of acid solutions containing 75.0 to 80.0 percent by weight nitric acid a relatively dry product can be obtained without the necessity for additional heating or stripping by heated gas. However, if so desired, continued heating of the reaction product for several minutes after the reaction has taken place may be desirable and advantageous to obtain maximum expulsion of moisture therefrom by maintaining the reaction product at a relatively high temperature.

As will be readily appreciated, variations in the amount of free acid provided by the urea nitrate product will occure if the urea and nitric acid do not react stoichiometrically so that the reaction should be closely controlled to ensure homogeneity of the reactants during the reaction and to minimize evolution of nitric acid fume. Moreover, it may be desirable for a given operation to ascertain the amount of unreacted urea in the resultant product and to compensate for probable losses in the nitric acid component reflected thereby by addition to the reaction vessel of an excess reflecting the probable loss.

Thus it can be seen from the foregoing specific examples and detailed description that the present invention provides an improved method for the manufacture of relatively dry urea nitrate within a short period of time and at relatively low cost since the exothermic reaction itself may be utilized as a means for expelling the major portion of the moisture in the reaction product resulting from the use of the aqueous solutions of nitric acid required for the present invention. By utilization of the specified range of aqueous solutions of nitric acid in the present invention, the two components may be admixed under conditions which permit control of the reaction to yield the desired product as contrasted with the very serious problems which would result from the use of highly concentrated nitric acid solutions and the poor operation with more dilute acid concentration. Moreover, the method of the present invention enables a relatively high degree of variation in apparatus design and enables substantally continuous operation, to achieve a product having great value as a dry source of nitric acid and unusual properties in metal treatment baths.

Having thus described the invention, I claim:

1. In the method of making urea nitrate, the steps comprising admixing urea and an aqueous solution of 63.0 to 85.0 percent by weight of nitric acid; controlling the heat of reaction within the admixture during the period immediately following the reaction therein to obtain a temperature of about 105 to 135° centigrade within the reaction product; agitating said reaction product so as to produce substantial homogenetity therein and to expose substantially the entire mass of the reaction product to the atmosphere for evolution of moisture therefrom; and thereafter cooling the reaction product to obtain urea nitrate as a relatively dry powder.

2. The method of claim 1 wherein said urea and said nitric acid solution are in substantially equal molar quantities.

3. The method of claim 1 wherein said aqueous solution contains 63.0 to 75.0 percent by weight nitric acid and is preheated.

4. The method of claim 1 wherein said aqueous solution contains 75.0 to 85.0 percent by weight nitric acid and is employed at ambient temperature.

5. The method of claim 1 wherein said reaction product is heated during said agitation.

6. In the method of making urea nitrate, the steps comprising admixing urea and an aqueous solution of 63.0 to 85.0 percent by weight of nitric acid; controlling the heat of reaction within the admixture during the period immediately following the reaction therein to obtain a temperature of about 105 to 135° centigrade within the reaction product; agitating said reaction product so as to produce substantial homogeneity therein and to expose substantially the entire mass of the reaction product to the atmosphere for evolution of moisture therefrom; passing through said reaction product as it is being agitated a heated gas relatively inert thereto and of relatively low moisture content to assist in removal of moisture from said reaction product; heating said reaction product during the period of agitation and gas passage therethrough; and thereafter cooling the reaction product to obtain urea nitrate as a relatively dry powder.

7. The method of claim 6 wherein said urea and said nitric acid are in substantially equal molar quantities.

8. The method of claim 6 wherein said aqueous solution contains 63.0 to 75.0 percent by weight nitric acid and is preheated.

9. In the method of making urea nitrate, the steps comprising admixing urea and an aqueous solution of 75.0 to 80.0 percent by weight of nitric acid in substantially equal molar quantities; controlling the heat of reaction within the admixture during the period immediately following the reaction therein to obtain a temperature of about 105 to 135° centigrade within the reaction product; agitating said reaction product so as to produce substantial homogeneity therein and to expose substantially the entire mass of the reaction product to the atmosphere for evolution of moisture therefrom; and thereafter cooling the reaction product to obtain urea nitrate as a relatively dry powder.

References Cited

UNITED STATES PATENTS 1,943,031   1/1934   J. Meissner _____ 260—688

OTHER REFERENCES

Kirk-Ohtmer: Encyclopedia of Chem. Tech., vol. 14 (1955), page 467.
Lauer et al.: Chem. Eng. Tech. (1952), page 369.
Robertson: Laboratory Practice of Organic Chemistry (3rd edition, 1954), pages 238 and 252.
Weissberger: Techniques of Org. Chem., vol. 4 (1951), page 17.

ALEX MAZEL, *Primary Examiner.*

HENRY R. JILES, *Examiner.*